UNITED STATES PATENT OFFICE.

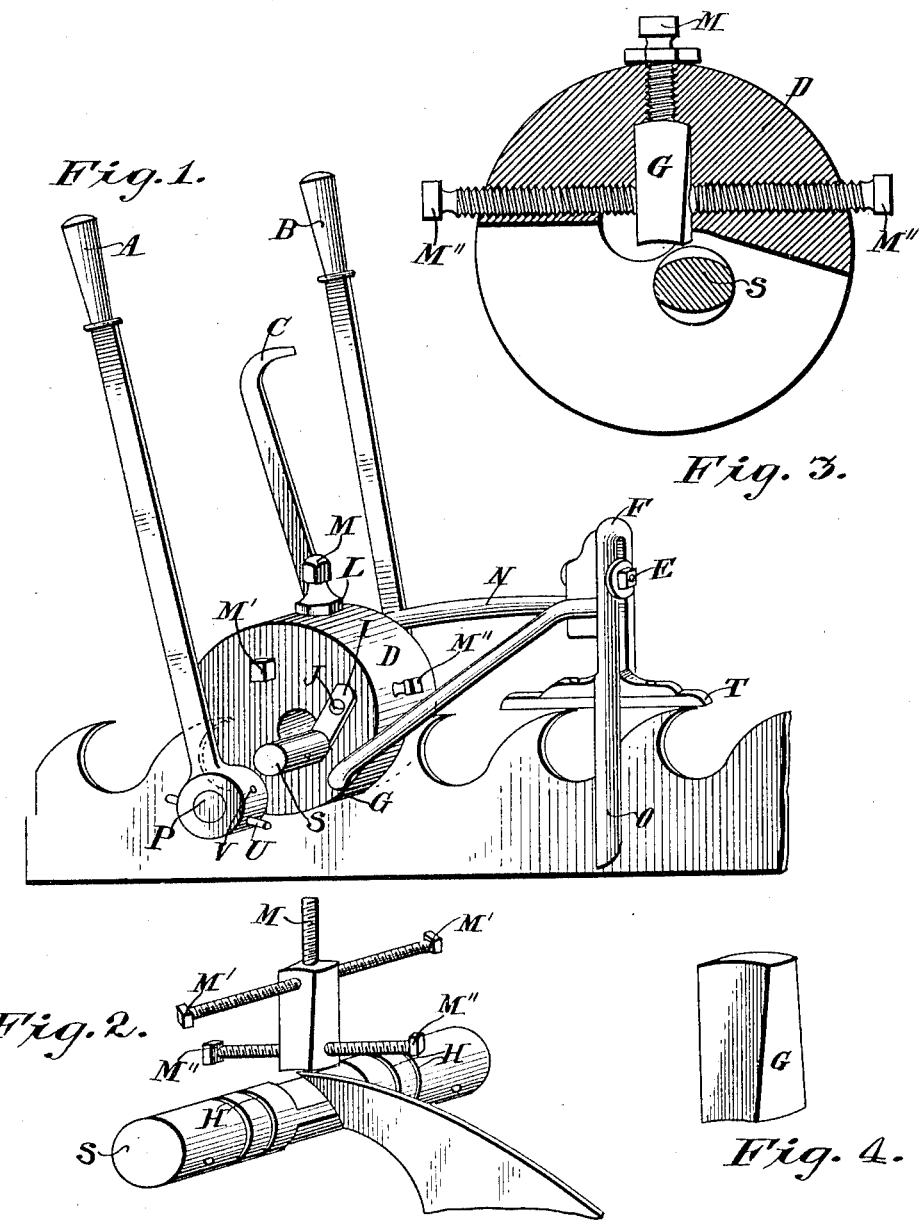

GEORGE F. CONNER, OF PORT HURON, MICHIGAN.

SAW-SWAGE.

1,066,998.  Specification of Letters Patent.  Patented July 8, 1913.

Application filed April 13, 1911. Serial No. 620,743.

*To all whom it may concern:*

Be it known that I, GEORGE F. CONNER, a citizen of the United States, residing at the city of Port Huron, in the county of St. Clair and State of Michigan, have invented a new and useful Saw-Swage, of which the following is a specification.

My invention relates to improvements in saw swages used for broadening and sharpening the points of saw teeth; and the objects of my invention are to provide, first, a saw swage with an anvil whose face may be easily adjusted to any position desired, as related to the roller; second, a saw swage with an anvil whose face is concave to conform to the general curve of the top of the saw tooth; third, a saw swage with an anvil whose face is convex crosswise of the saw tooth to aid in the flaring of the tooth; fourth, a saw swage with an anvil which may be reversed in position to bring new surfaces into use when worn; fifth, a saw swage with a strong and convenient bracket for adjusting and holding the swage in the correct position upon the teeth of the saw; and, sixth, a saw swage with an adjustable handle fastening, by which the handles may readily be made to assume different positions. I attain these objects by the mechanism illustrated in the accompanying drawing, in which—

Figure 1 is a perspective view of the saw swage; Fig. 2, is a detailed view in perspective of the anvil and roller with the saw tooth in position as it would appear with the body removed; Fig. 3, is a longitudinal vertical section through the center of the swage; Fig. 4, is a detailed view in perspective of the anvil.

Similar letters refer to similar parts throughout the several views.

The body D has in its underside a longitudinal recess through which the saw blade, the teeth of which the operator desires to swage, passes. Extending across this recess and running through the body D and projecting slightly therefrom, is the roller S. This roller is turned eccentric at its center, which eccentric part is twice the length of the face of the tooth so that it can be moved endwise when worn, to bring the new face in position. This is also true of each side as well as each end, which gives eight wearing faces.

The roller S and the clamp-screw P are held in the handles B and A by taper pins U. These make a secure and easily adjustable fastening. By means of these handles, the operator manipulates the roller and clamp-screw. It is sometimes necessary to change the handles to different angles. This can be done by removing the taper pin U and rotating the handle around and inserting the pin in extra holes V, provided for that purpose.

The roller S is held from sliding transversely by the plate I which is securely fastened to the body D by the screw J. By disconnecting the plate I from the respective annular groove H of the roller S, the latter can be moved transversely to the desired position, after which the plate I is moved to engage the corresponding annular groove H so as to hold the roller S from moving transversely, but permitting it to turn.

The anvil G as shown in Fig. 2 is placed directly on top of the tooth in the body D in an open space or cavity provided for that purpose. The anvil is vertically reversible. Its lower end coming in contact with the tooth is wider cross-wise of the saw than it is length-wise of the tooth, while the upper end is in a reversed position. Its lower end is concave length-wise of the saw to conform with the general curve of the tooth, while it is convex the reversed way, cross-wise of the saw. Each end of the anvil may be used in two positions, making four wearing faces, the front corner of the anvil being subject to more work wears faster than the rear corner. By thus changing the position of the anvil its wearing life is greatly increased.

The tooth is placed between the anvil G and the roller S and held by the screw clamps P when set up securely. The roller S is turned against the tooth, which causes the metal of the tooth to flow out along the lines of least resistance. Part of the metal is drawn out at the point of the tooth while the remaining surplus is forced out on each side of the tooth at its front edge.

It will be observed that by tipping the anvil G side-wise by means of the upper or transverse set screws M', the tooth will be swelled out slightly more on the open side than on the opposite side, thus causing the tooth to make a wider cut on that side. In this way the cut or lead of the saw is easily controlled. The lower or longitudinal set screws M'' are for changing the taper of the tooth to make it more slim or blunt as desired. The top set screw M is for adjusting the anvil toward the roller.

The lever C limits the range of action of the lever B. Extending longitudinally from the body D with its ends bent at right angles, firmly secured in parallel holes G, one of which holes is located in the upper part of the body D and the other in the lower part and on the opposite side, is the bracket N made of one piece of metal on which is held, vertically adjustable, an arm F, the lower end O of which is forked and is adapted to receive and guide the saw blade. On the teeth of the latter rests a longitudinal arm T extending from O. The arm F can be vertically adjusted by bolt E held by the bracket N and passing through the slot in the arm F. By means of this bracket, the body D may be rotated on its axis and adjusted for the purpose of causing the point of the tooth to be finished and stand at the proper angle as relates to the cutting path of the saw.

I claim:

1. In a saw swage, an anvil whose longitudinal sides converge in an upwardly direction and whose latitudinal sides converge in a downwardly direction and having two ends each of which is concaved and convexed.

2. In a saw swage, the combination of a body an eccentric roller journaled in the body, an anvil held in the body adjacent to the roller, means for adjusting the anvil toward the roller and means for tipping the anvil both longitudinally and laterally.

3. In a saw swage, the combination of a body, an eccentric roller journaled in the body, a vertical recess in the body, an anvil in the recess whose upper end is smaller laterally than the recess and whose lower end is smaller longitudinally than the recess, set screws for adjusting the upper end of the anvil laterally and set screws for adjusting the lower end longitudinally.

4. In a saw swage, a body, a roller journaled in the body, parallel holes in the ends of the body out of alinement with each other, a one piece bracket N with its parallel ends inserted in the said holes, an adjustable arm F secured to the bracket N.

5. In a saw swage, a body with an eccentric roller extending through the body, means for revolving the roller, an anvil in the body at right angles to the roller and having two ends each of which is both concaved and convexed.

GEORGE F. CONNER.

Witnesses:
ROBERT M. SOUTAR,
MINNIE A. WAITE.

---

Copies of this patent may be obtained for five cents each, by addressing the "Commissioner of Patents, Washington, D. C."